(12) United States Patent
Bhanage et al.

(10) Patent No.: US 9,510,329 B2
(45) Date of Patent: Nov. 29, 2016

(54) DYNAMIC USER-CONFIGURABLE INFORMATION ELEMENT

(71) Applicant: Aruba Networks, Inc., Sunnyvale, CA (US)

(72) Inventors: Gautam D. Bhanage, Sunnyvale, CA (US); Venkatesh Kannan, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 27 days.

(21) Appl. No.: 14/340,951

(22) Filed: Jul. 25, 2014

(65) Prior Publication Data

US 2016/0029356 A1    Jan. 28, 2016

(51) Int. Cl.
| | | |
|---|---|---|
| *H04W 4/00* | (2009.01) | |
| *H04W 72/04* | (2009.01) | |
| *H04L 5/00* | (2006.01) | |
| *H04W 48/10* | (2009.01) | |
| *H04W 48/12* | (2009.01) | |
| *H04W 88/08* | (2009.01) | |
| *H04W 84/12* | (2009.01) | |

(52) U.S. Cl.
CPC ........ *H04W 72/0406* (2013.01); *H04L 5/0053* (2013.01); *H04W 48/10* (2013.01); *H04W 48/12* (2013.01); *H04W 84/12* (2013.01); *H04W 88/08* (2013.01)

(58) Field of Classification Search
CPC .. H04L 5/0053; H04W 88/08; H04W 84/12; H04W 48/12
USPC .......................................................... 370/329
See application file for complete search history.

(56) References Cited

U.S. PATENT DOCUMENTS

| | | | | |
|---|---|---|---|---|
| 8,732,315 | B2* | 5/2014 | Chhabra | H04L 5/0091 370/335 |
| 8,938,237 | B2* | 1/2015 | Zappulla | H04W 48/12 455/434 |
| 2005/0078644 | A1* | 4/2005 | Tsai | H04L 29/06 370/338 |
| 2009/0129356 | A1* | 5/2009 | Zhong | H04W 88/04 370/338 |
| 2009/0175250 | A1* | 7/2009 | Mathur | H04W 48/20 370/338 |
| 2010/0202339 | A1* | 8/2010 | Chieng | H04L 12/5895 370/312 |
| 2012/0162013 | A1* | 6/2012 | Piersol | H04W 64/003 342/386 |
| 2013/0128811 | A1* | 5/2013 | Bradish | H04W 68/005 370/328 |

(Continued)

OTHER PUBLICATIONS

Chandra et al., "Beacon-Stuffing: Wi-Fi Without Associations", Mobile Computing Systems and Applications, Feb. 26, 2007, 7 pages.

(Continued)

*Primary Examiner* — Faisal Choudhury
(74) *Attorney, Agent, or Firm* — Brooks, Cameron & Huebsch, PLLC

(57) ABSTRACT

According to one embodiment of the invention, a system for providing a dynamic user-customizable beacon information element (IE) is described. One embodiment of the system comprises an access point comprising a hardware processor wherein the system is configured to perform operations comprising: periodically transmitting, by an access point, a first beacon frame comprising a plurality of IEs, based on user input, configuring at least one IE of the plurality of IEs in the first beacon frame, modifying the at least one IE in the first beacon frame based at least on the user input to obtain a second beacon frame comprising a modified IE based on the user input and periodically transmitting, by the access point, the second beacon frame comprising the modified IE.

18 Claims, 10 Drawing Sheets

(56) References Cited

U.S. PATENT DOCUMENTS

| | | | |
|---|---|---|---|
| 2014/0087752 A1* | 3/2014 | Zhu | H04W 24/00 455/456.1 |
| 2014/0295762 A1* | 10/2014 | Jung | H04W 48/16 455/41.2 |
| 2015/0119031 A1* | 4/2015 | Brownworth | H04W 60/005 455/435.1 |
| 2015/0296530 A1* | 10/2015 | Wu | H04W 68/00 370/311 |
| 2015/0310664 A1* | 10/2015 | Boussard | G06T 19/006 345/633 |

OTHER PUBLICATIONS

Koenings et al. "PriFi Beacons: Piggybacking Privacy Implications on WiFi Beacons", UbiComp'13, Sep. 8, 2013, 4 pages, Zurich, Switzerland.

* cited by examiner

DYNAMIC USER-CONFIGURABLE INFORMATION ELEMENT

FIELD

Embodiments of the disclosure relate to the dynamic customization of information elements to improve scalability and interoperability of a wireless communications network.

GENERAL BACKGROUND

In recent years, wireless client devices have emerged as a fast-growing market. As one example, a network device may use communicate via a Wireless Local Area Network (WLAN). Among the various WLAN technologies, the Institute of Electrical and Electronics Engineers (IEEE) 802.11 standard is the dominating technology and is frequently used for WLANs.

Client devices within WLANs communicate with access points in order to obtain access to one or more network resources. An access point, referred to as an "AP," is a digital device that operates as a gateway for a client device to establish a connection (e.g., a communicative coupling) with one or more networks (e.g., the Internet, an intranet, etc.). For example, an AP may be implemented as a wireless AP (WAP), which is configured to communicate wirelessly with one or more client devices as well as communicate with a networked device associated with the one or more networks, such as a controller for example, through a wired connection.

Client devices associate with an AP ("the associated AP") and thereafter receive communications over the network from the associated AP. Each associated AP transmits network communications to the appropriate client device and also transmits beacons at regular intervals. The beacons are received by all client devices within range of the AP regardless of whether the client devices are associated with the AP. A "beacon" is information in a prescribed format that is used in managing a wireless network. The beacon allows an AP to alert all client devices within range of its presence, this in turn notifies a client device of the one or more APs with which it may associate in order to connect to the wireless network. Based on the beacon, among other factors, the client device can determine the most appropriate AP to which it should associate. For example, the client device may determine to which AP it should associate based on a received signal strength indicator (RSSI) as measured for a beacon. Other data may also be included within a beacon describing various statistics about the network to each client device within range, such as the particular capabilities of each AP from which the client device received the beacon.

Various problems have arisen with wireless communication networks regarding the distribution of information from an AP. Two such problems include attempting to scale the transmission of information from an AP to client devices within range of the AP and the handling of the lack of interoperability of various devices connected to the network. For example, an AP may distribute information to all client devices associated with the AP via a broadcast message transmitted at regular intervals in addition to the transmission of the beacon. However, this strategy of distributing information requires unnecessary overhead and excessive traffic on the network. As the network grows, the scalability issue is magnified. In addition, one or more client devices connected to the network may process transmissions differently than another client device, therefore requiring transmissions to be in various formats. For example, a first client device running Apple® iOS may process a received transmission differently than a second client device running Android™ Jelly Bean. Therefore, an AP distributing information via a broadcast transmission may be required to send the same transmission in various formats causing excessive traffic the network.

Current approaches for modifying the information distributed via a beacon require the manufacturer of the APs to modify computer software of the APs connected to the network. This further requires that, once the modifications have been made to the computer software, the APs on the network be updated with the modified computer software. For example, computer software may include a binary file such as a device driver of the AP. Typically, this requires that the APs be disconnected from the network. Therefore, currently, a modification of the information distributed via a beacon is a process that is disruptive to the network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
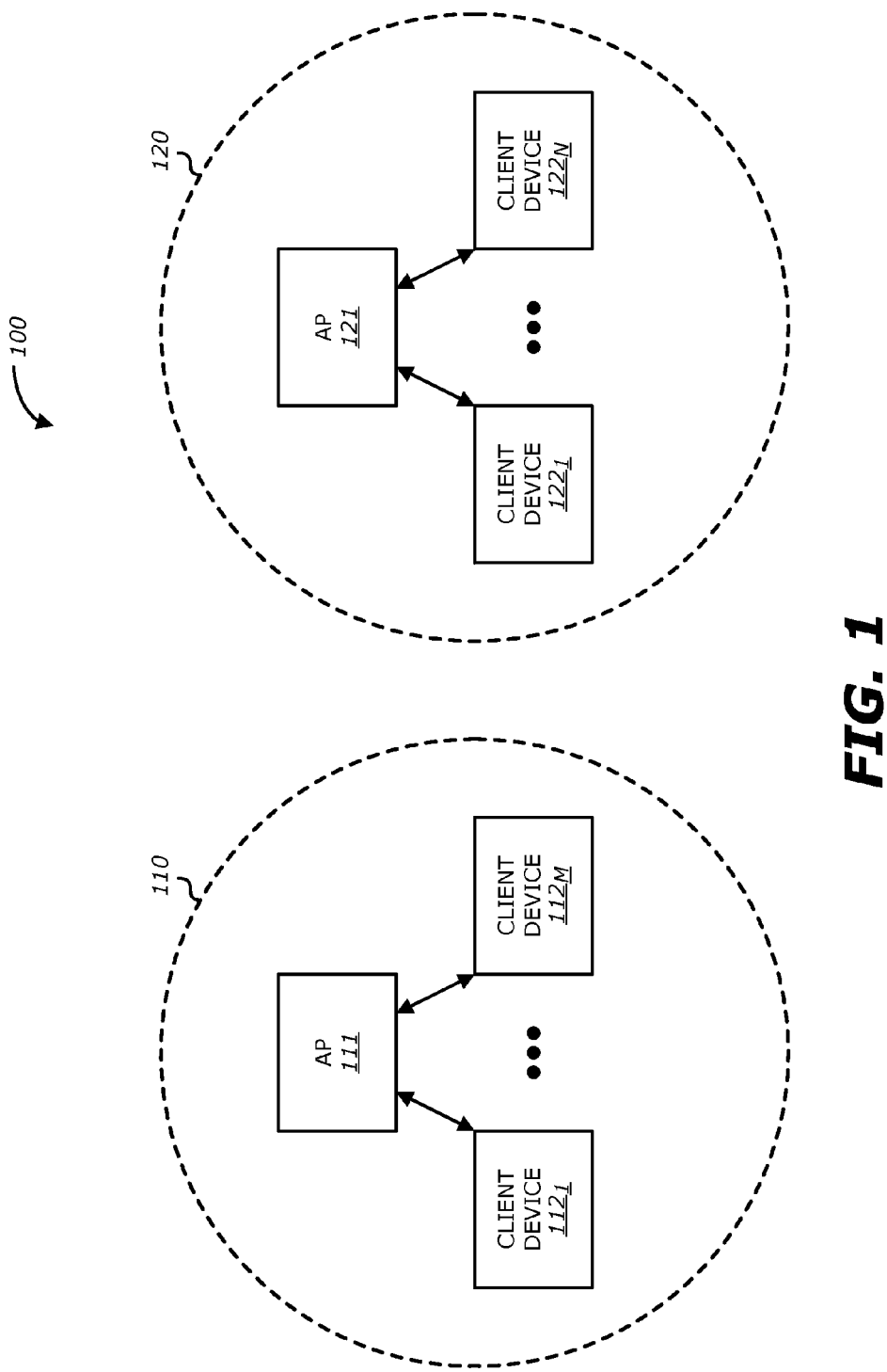
FIG. 1 is an exemplary diagram comprising a first client device receiving a first beacon from a first access point (AP) and a second client device receiving a second beacon from a second AP within a wireless communication network.

Various embodiments of the disclosure relate to user customization of dynamic information distributed in a beacon by an access point (AP) to one or more client devices within range of the AP within a Wireless Local Area Network (WLAN). A user deploying the network may modify an information element (IE) in a beacon that is transmitted to one or more client devices within range of one or more APs. The modification of the IE may include altering the content of the information being transmitted, adding one or more new IEs in the beacon, and/or removing one or more IEs currently included in the beacon. A client device may perform tasks according to the one or more customized IEs included in the beacon or modify characteristics of the client device according to the one or more customized IEs.

I. TERMINOLOGY

Herein, certain terminology is used to describe features within embodiments of the invention. For example, the term "network device" generally refers to electronic equipment which may be configured with an antenna system that enables transmission and/or receipt of wireless messages over a wireless network. Hence, the network device is further adapted with circuitry to support wireless connectivity with other network devices being part of the wireless network. Different types of network devices may include, but are not limited to (1) a client device and (2) an edge device.

Herein, the term "client device" may refer to a stationary network device (e.g., desktop computer, television, set-top box, video gaming console, etc.) or a mobile network device capable of connecting to one or more wireless networks. Illustrative examples of mobile network devices may include, among others, a tablet, laptop, netbook, bar-code scanner, a digital camera, and/or a mobile handset such as a smartphone or a personal digital assistant "PDA." Likewise, the term "access point" or "AP" is a network device, a type of edge device in particular, that controls access to a network, where the AP may be deployed as a wired access point that featured wired connectivity with one or more client devices or as a wireless access point that featured wireless connectivity with one or more client devices. Of course, the AP also may represent other types of edge devices such as a wireless base station, a cellular base station, or any device configured as a hot spot or gateway for network connectivity.

It is contemplated that a network device includes hardware logic such as one or more of the following: (i) processing circuitry (e.g., a hardware processor); (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

The term "beacon" refers to data broadcast by an AP and received by any client device within range of the AP. A beacon may be a management frame that allows the transmitting AP to notify any client devices within range of the AP that the AP is operating. For example, the beacon may indicate to one or more client devices that it would be advantageous to the client device to associate itself with the transmitting AP based on one or more statistics included in the beacon. Examples of such statistics include, but are not limited or restricted to, a timestamp, a service set identifier (SSID) of the WLAN, transmission rates of the WLAN and/or requirements necessary to connect to the WLAN on which the beacon was transmitted. A beacon may further act as a "heartbeat" such that the beacon indicates to any client devices associated with the transmitting AP that the AP is still operating. In addition, a beacon may include a frame header and/or a portion containing a cyclic redundancy check (CRC). Throughout the specification and claims, the terms "beacon" and "beacon frame" are used interchangeably.

The term "information element (IE)" should be construed as an encoding of data, including network management information, that is to be communicated between a transmitting electronic device and one or more client devices (e.g., stations) located within the transmission range of the transmitting electronic device. Examples of a transmitting electronic device include, but are not limited or restricted to, an access point (AP) operating on a WLAN, a Bluetooth® transmitter, a Bluetooth® Low Energy (LE) transmitter, a radio frequency identification (RFID) transmitter, etc. In one embodiment, the IE may be located within a beacon. Alternatively, in a second embodiment, the IE may be located within a probe response.

The term "customize" should be construed as the modification of the characteristics and/or contents of a frame that may hold one or more IEs, such as a beacon, according to a user's preferences or specifications. For instance, customizing a beacon may include, but is not limited or restricted to, altering the contents of one or more IEs included within the beacon transmission, providing additional IEs to be included in the beacon transmission and/or removing one or more IEs in future beacon transmissions. Throughout the specification and claims, the terms "customize" and "modify" are used interchangeably.

The term "dynamically user-customizable information element (IE)" should be construed as an IE of a beacon that may be modified. In particular, the dynamically user-customizable IE may be altered, added to or removed from the beacon. Throughout the specification and claims, the terms "dynamically user-customizable IE" and "dynamically user-customizable beacon IE" are used interchangeably.

The term "one or more operations influenced or controlled by" should be construed as the acceptance of content included within at least a portion of a beacon. A client device may be within range of multiple APs and therefore receive beacons from the multiple APs. A beacon that a client device receives but disregards is not a beacon that influences or controls one or more operations of the client device. A client device may allow the information included within a received beacon to influence one or more operations of the client device. This should be construed as the client device considering at least a portion of the received beacon when making one or determination (e.g., with which AP the client device should associate). In addition, the client device may allow the information included within a received beacon to control one or more operations of the client device (e.g., the beacon may instruct the client device to present a notification to the user).

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. ACCESS POINT (AP) TRANSMISSION OF DYNAMICALLY USER-CUSTOMIZABLE INFORMATION ELEMENTS WITHIN A BEACON

Referring to FIG. 1, an exemplary diagram comprising a first group of one or more client devices receives a first beacon from a first AP and a second group of one or more client devices receives a second beacon from a second AP within a wireless communication network is shown. The wireless communications network 100 comprises the AP 111, the AP 121, the client devices $112_1$-$112_M$ and the client devices $122_1 \ldots 122_N$. The range 110 illustrates an exemplary range for the AP 111 and the range 120 illustrates an exemplary range for the AP 121. FIG. 1 illustrates that the client devices $112_1$-$112_M$ are located within the range 110, while the client devices $122_1$-$122_N$ is located within the range 120.

When an AP transmits a beacon, any client device within range of the AP will receive the beacon. In the exemplary embodiment of FIG. 1, when the AP 111 transmits a beacon, only client devices within the range 110 will receive the beacon, namely client devices $112_1$-$112_M$. Likewise, when the AP 121 transmits a beacon, only client devices within the range 120 will receive the beacon, namely client devices $122_1$-$122_N$. Therefore, a user deploying the wireless communications network 100 may transmit a first group of one or more dynamically user-customizable beacon IEs to the client device $112_1$-$112_M$ in the beacon of the AP 111. Similarly, the user may transmit a second group of one or more dynamically user-customizable beacon IEs to the client devices $122_1$-$122_N$ in the beacon of AP 121. The first group of one or more dynamically user-customizable beacon IEs may be the same as or different than the second group of one or more dynamically user-customizable beacon IEs.

As an example, the embodiment illustrated in FIG. 1 may correspond to a WLAN within a hospital wherein the each client device of the client devices $112_1$-$112_M$ and the client devices $122_1$-$122_N$ correspond to a client device in a separate room within the hospital. In such an example, each client device may represent a telephone with wireless capabilities. Furthermore, a user deploying the network might be, for example, a nurse employed by the hospital. A shift-change among nurses may lead to the nurse for one or more patients changing. Ideally, the nurse beginning her shift would be able to update the telephones in her patients' rooms (i.e., one or more of the client devices $112_1$-$112_M$ or the client devices $122_1$-$122_N$) by sending out her name and/or contact information. Therefore, one embodiment of the disclosure enables a user, i.e., a nurse, to customize a beacon being transmitted by one or more APs such that the customized beacon includes information specified by the user.

Continuing the example and still referring to FIG. 1, the nurse beginning her shift may customize the beacon of AP 111 and/or AP 121 such that it no longer includes the name and contact information of the previous nurse but instead includes her name and contact information. The nurse modifies information transmitted in the beacon of AP 111 and/or AP 121 by dynamically customizing one or more IEs of the beacon of one or more APs.

In one embodiment, the nurse may be responsible for rooms corresponding to the client devices $112_1$-$112_M$ and would therefore modify the dynamically user-customizable beacon IEs representing the nurse's name and the nurse's contact information of the beacon corresponding to the AP 111. These modified dynamically user-customizable beacon IEs would then be transmitted to the AP 111. Thereafter, the AP 111 would transmit beacons that include the modified dynamically user-customizable beacon IEs representing the nurse's name and the nurse's contact information. This dynamic user-customization may be done in real time while the AP 111 is continuing to provide network access to the client devices $112_1$-$112_M$. In addition, the nurse may specify a subset of virtual access points executing on the AP 111 that is to transmit one or more dynamically user-customizable IEs.

Figure 2:
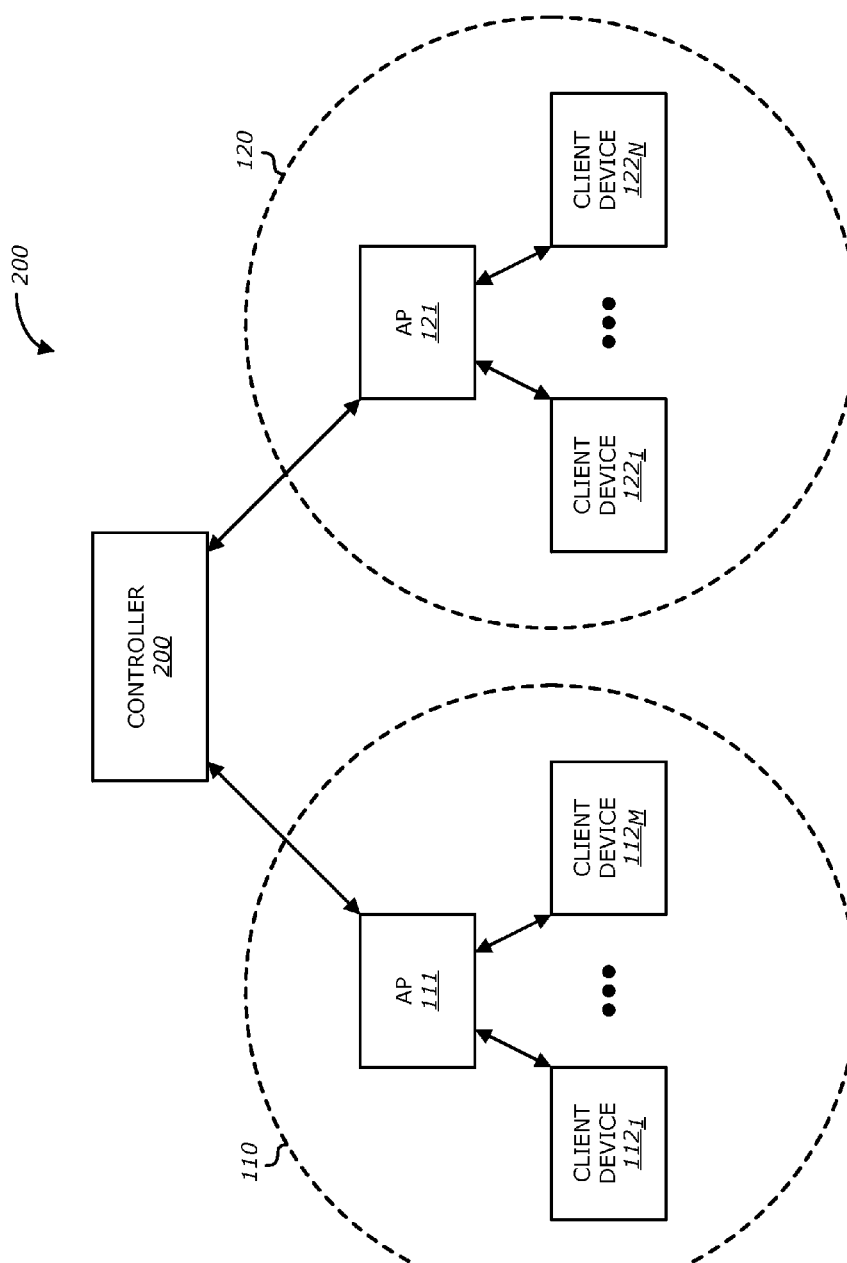
FIG. 2 is the exemplary diagram of FIG. 1 wherein the first AP and the second AP are associated with a controller.

Referring to FIG. 2, the exemplary diagram of FIG. 1 is illustrated wherein the first AP and the second AP are associated with a controller is shown. The wireless communications network 200 includes the AP 111, the AP 121, the client devices $112_1$-$112_M$, the client device $122_1$-$122_N$ and the controller 200 (e.g., a network device). The controller 200 may manage the APs that are associated with the controller 200. In the example embodiment illustrated in FIG. 2, the AP 111 and the AP 121 are in communication with the controller 200. Therefore, the controller 200 manages the AP 111 and the AP 121 by providing the AP 111 and the AP 111 with, among other things, information pertaining to any client devices associated with the APs and/or information regarding the status of the network.

In an embodiment wherein one or more APs are associated with a controller, the dynamically user-customizable beacon IE may propagate from the user to the one or more APs through the controller. For example, a user may dynamically customize one or more IEs to be transmitted in the beacon of the AP 121 by updating the content of one or more dynamically customizable IEs included in the beacon of AP 121. The modified content may pass from the device used by the user (referred to as "user input device") to modify the one or more IEs, to the controller 200, and from the controller 200 to the AP 121. The user input device will be discussed in more detail below.

In addition, the controller 200 may conduct an action or some actions based on the one or more dynamically user-customizable beacon IEs propagating from the user. The controller 200 may modify an operation or functionality of the controller 200 or of the AP 111 and/or the AP 121 based on the one or more dynamically user-customizable beacon IEs. It should be noted that the controller 200 and the AP 111 and/or the AP 121 do not necessary have to be provided by the same vendor or manufacturer.

Figure 3:
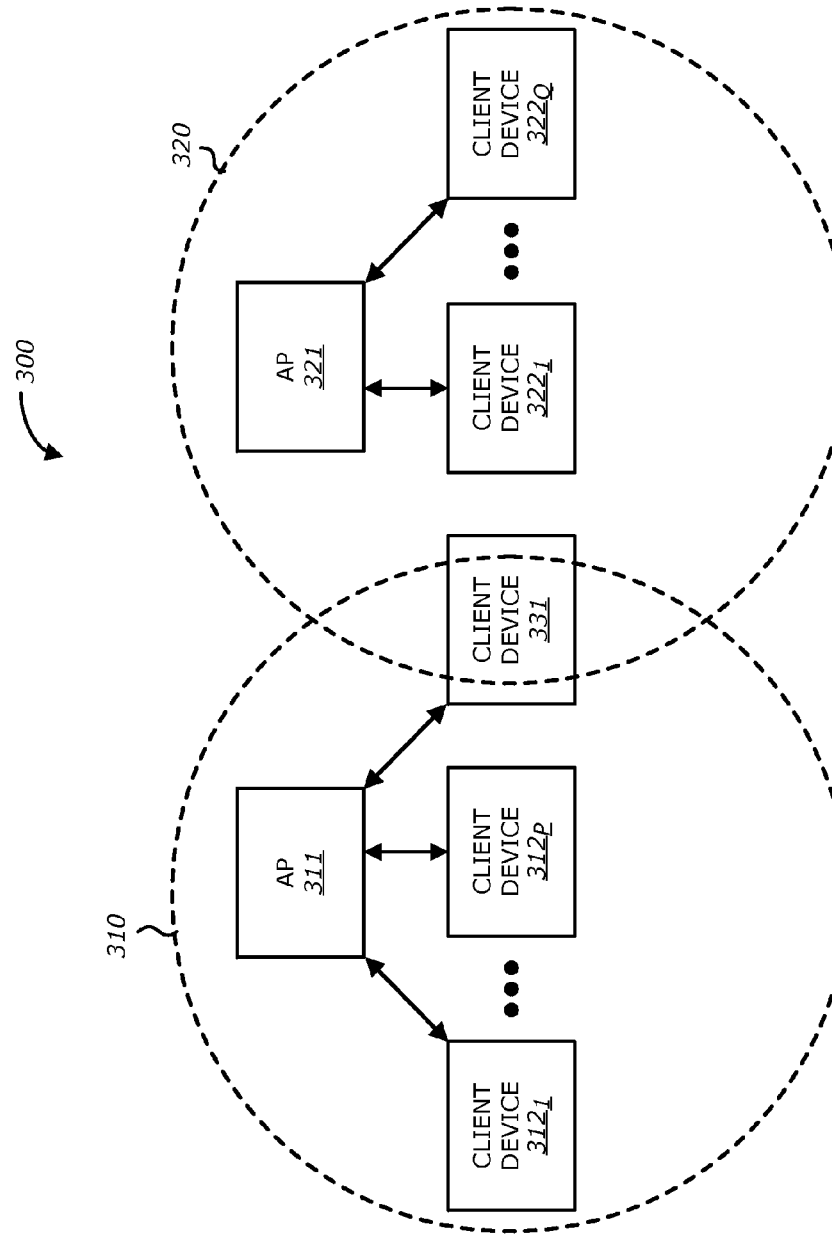
FIG. 3 is an exemplary diagram illustrating one or more client devices receiving a first beacon from a first AP, one or more client devices receiving a second beacon from a second AP, and a client device receiving both the first beacon from a first AP and the second beacon from the second AP within a wireless communication network.

In the exemplary illustrations of FIGS. 1 and 2, the transmission ranges of the APs (the AP 111 and the AP 121) do not overlap. Therefore, the situation provided in FIGS. 1 and 2 is such that each client device illustrated only received transmission of beacons from a single AP. Referring to FIG. 3, an exemplary diagram illustrating one or more client devices receiving a first beacon from a first AP, one or more client devices receiving a second beacon from a second AP, and a client device receiving both the first beacon from a first AP and the second beacon from the second AP within a wireless communication network is shown. Lines containing arrows pointing to a client device and the associated AP indicate the associations of each client device with an AP. The range 310 of AP 311 includes the client devices $312_1 \ldots 312_P$ as well as the client device 331. The range 320 of AP 321 includes the client devices $322_1 \ldots 322_Q$ as well as the client device 331. Since the client devices $312_1 \ldots 312_P$ receive beacons only from the AP 311 and the client devices $322_1 \ldots 322_Q$ receive beacons only from AP 321, no decision is required by the client devices $312_1 \ldots 312_P$ or the client devices $322_1 \ldots 322_Q$ as to which beacon each should allow to influence or control one or more operations of the client devices $312_1 \ldots 312_P$ or the client devices $322_1 \ldots 322_Q$.

In contrast, the client device 331 is configured to decide as to which beacon influences its operability. For instance, the client device 331 (and perhaps all client devices) may include logic that determines, if multiple beacons are detected, which beacon controls, at least in part, operability of the client device 331. The functionality of this logic may vary depending on the parameters that are selected to influence the decision as to which beacon controls operability of the client device 331. In one exemplary embodiment, functionality of the client device 331 may be influenced by the beacon having the greatest signal strength (i.e., a beacon may parse each received beacon and compare the received signal strength indicator (RSSI) of each). Alternatively, a beacon may contain an identifier that identifies the client devices that should have one or more operations influenced or controlled, in whole or in part, by the particular beacon.

In one embodiment, the client devices $312_1$-$312_P$, the client devices $322_1$-$322_P$, and the client device 331 may each represent telephones located in separate hospital rooms. In such an embodiment, the nurse may only be responsible for rooms in which the client devices $322_1$-$322_Q$ are located. Therefore, by selecting the rooms the nurse will oversee (those in which the client devices $322_1$-$322_Q$ are located), she may set an identifier transmitted in the beacon of the AP 321. In such an embodiment, the beacon transmitted by the AP 321 would denote that the beacon is intended for the client devices $322_1$-$322_Q$ and contain the nurse's contact information. Therefore, the client device 331 would disregard the beacon transmitted by the AP 321 while the client devices $322_1$-$322_Q$ may modify their phone directories with the nurse's contact information.

In yet another embodiment, still referring to FIG. 3, the beacon transmitted by the APs 311 and 321 may each contain an identifier denoting the AP that transmitted the beacon. In such an embodiment, the client devices may have one or more operations influenced or controlled by beacons transmitted from the AP with which they are associated. For example, the client devices $312_1$-$312_P$ and the client device 331 may have one or more operations influenced or controlled by beacons transmitted by the AP 311 whereas the client devices $322_1$-$322_Q$ may have one or more operations influenced or controlled by beacons transmitted by the AP 321 due to their respective associations.

In yet another embodiment, still referring to FIG. 3, the beacon transmitted by the APs 311 and 321 may each contain an identifier denoting the AP that transmitted the beacon. In such an embodiment, the client devices may have one or more operations influenced or controlled by beacons transmitted from the AP with which they are associated. For example, the client devices $312_1$-$312_P$ and the client device 331 may have one or more operations influenced or controlled by beacons transmitted by the AP 311 whereas the client devices $322_1$-$322_Q$ may have one or more operations influenced or controlled by beacons transmitted by the AP 321 due to their respective associations.

In addition, an embodiment may exist such that a first AP is located within the transmission range of a second AP (not shown). In this situation, the first AP may receive the beacons transmitted by the second AP. The first AP may use the information included in the beacon of the second AP to determine, among other things, the saturation of the channel of the first AP and/or of the second AP.

Figure 4:
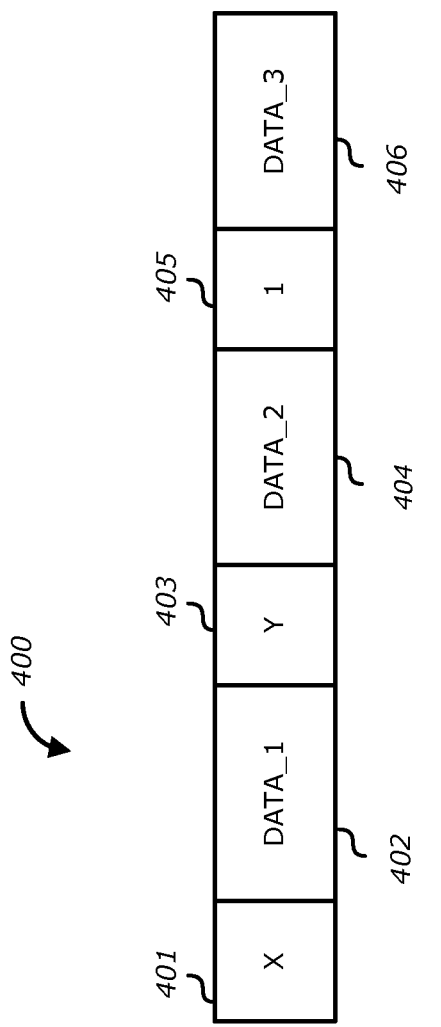
FIG. 4 is an exemplary portion of a beacon.

Referring to FIG. 4, an exemplary portion of a beacon is shown. The beacon 400 comprises data to be transmitted consists of a single transmission wherein the data is separated into sequential blocks of bytes. In the exemplary embodiment of FIG. 4, six blocks of bytes, blocks 401-406, are illustrated. Blocks 401, 403 and 405 include identifiers ('X,' 'Y' and '1' respectively). In one embodiment, client devices receiving the beacon 400 may parse the beacon 400 looking for a particular identifier. For example, a client device may receive multiple beacons but have one or more operations influenced or controlled by information corresponding to a particular identifier. Following the identifier in the block 401, the block 402 includes data corresponding to identifier 'X'. Similarly, the block 404 includes data corresponding to identifier 'Y' and the block 406 includes data corresponding to identifier "1."

Therefore, a client device receiving one or more beacons may decide which beacon it should allow to influence or control one or more operations of the client device based on which beacon includes a particular identifier. Furthermore, the client device may disregard any information not included in the data corresponding to the particular identifier. Still referring to FIG. 4, an identifier may indicate that the subsequent information is relevant to all client devices receiving the beacon. For example, the block 405 contains the identifier '1' which may indicate that the subsequent information is relevant to all client devices. In such a situation, all client devices receiving the beacon 400 would allow at least the portion of the beacon 400 pertaining to the identifier "1" to influence or control one or more operations of the receiving client devices. As an example, an identifier relevant to all client devices may correspond to information such as, among others, the current capacity of the AP. As an alternative example, the identifier '1' may signify that there is an emergency and that the subsequent information is relevant to all client devices receiving the beacon. In one embodiment, the reception of the beacon by one or more telephones (i.e., client devices) may cause the one or more telephones to ring and play a prerecorded message when the telephone is answered.

Each of the blocks 401-406 may represent a dynamically user-customizable IE and can therefore be modified by a user. For example, a nurse beginning a shift may modify block 402 to include her name and block 404 to include her contact information. The AP transmitting the beacon 400 would begin transmitting the beacon 400 immediately such that the beacon 400 would include the information modified by the nurse beginning her shift.

Figure 5:
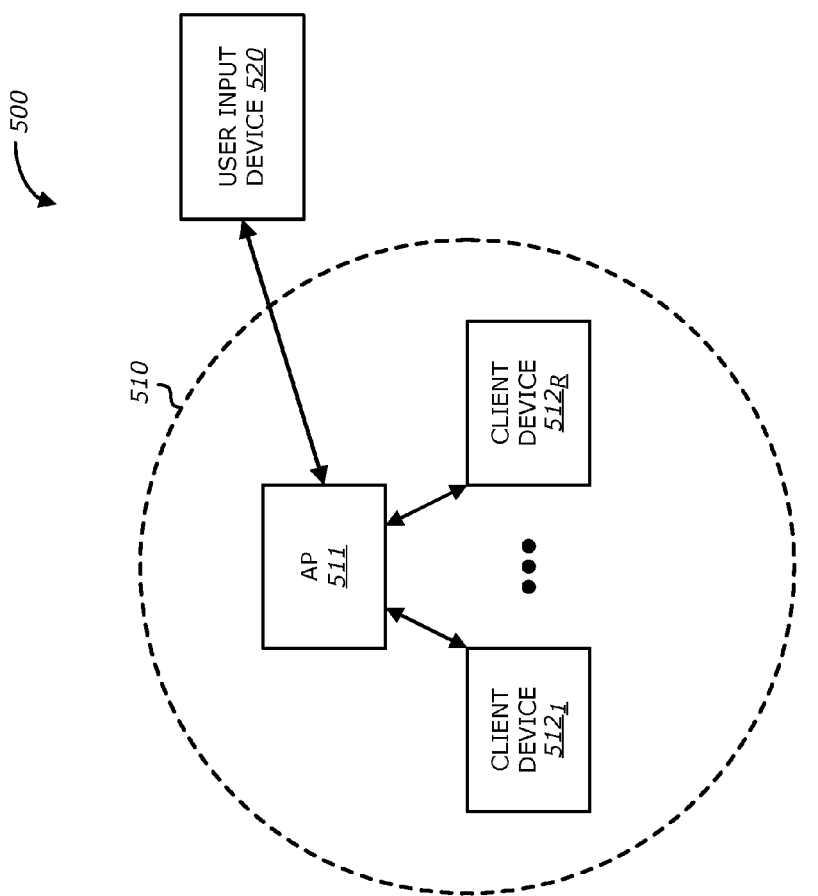
FIG. 5 is an exemplary diagram illustrating one or more client devices receiving a beacon from an AP that receives a modification, from a user input device, to information included within the beacon transmitted by the AP within a wireless communication network.

Referring to FIG. 5, an exemplary diagram illustrating one or more client devices receiving a beacon from an AP that receives, from a user input device, a modification to information included within the beacon transmitted by the AP within a wireless communication network is shown. The wireless communications network 500 comprises the AP 511, the client devices 512$_1$-512$_R$ and the user input device 520. The range 510 illustrates an exemplary range for the AP 511. FIG. 5 illustrates that the client devices 512$_1$-512$_R$ are located within the range 510 and therefore receive the beacon transmitted by the AP 511. The user input device 520 provides a modification to the information included in one or more dynamically user-customizable IEs of the beacon of AP 511. In addition, the AP 511 may modify one or more dynamically user-customizable IEs immediately upon receipt of instructions to modify the one or more dynamically user-customizable IEs from the user input device 520 or the user may specify a particular time at which the AP 511 is to modify the one or more dynamically user-customizable IEs. For example, a nurse may arrive to the hospital thirty minutes prior to the beginning of her shift and instruct the AP 511 to update one or more dynamically user-customizable IEs in thirty minutes with her name and contact information.

The user input device 520 may be any electronic device directly or indirectly connected to the AP 511. Examples of a user input device 520 include, but are not limited or restricted to, a computer, a mobile device such as a mobile telephone or a tablet, or an electronic device tailored specifically for updating information included within a beacon. In addition, a web interface (e.g., a webpage), a Command Line Interface (CLI) or an application may assist a user in updating information included within a beacon (to be discussed below). Furthermore, the user input device 520 may be a client device associated with the AP 511, associated with a different AP, or not associated with an AP on the wireless communications network 500 at all.

Furthermore, the user input device 520 may be an automatic function performed by a computer. For example, a computer containing a calendar populated with the times at which nurses' shifts begin and end may have access to a database of all nurses' names and contact information that are employed by a hospital. The computer may then be programmed such that when one nurse's shift begins or ends (as known by querying the calendar populated with the times at which a nurse's shift begins and ends), the computer may query the database containing the nurses' names and contact information and send the name and contact information of the nurse whose shift is beginning to the AP 511. The AP 511 may then modify one or more dynamically user-customizable IEs to include the name and contact information of the nurse whose shift is beginning. The AP 511 may then begin transmitting the beacon with the modified dynamically user-customizable IEs immediately.

For example, the wireless communications network 500 may be deployed within a school building wherein the AP 511 represents an AP within a classroom, the range 510 covers, at least, the area of the classroom, and the client devices 512$_1$-512$_R$ represent one or more electronic devices in use by one or more students in the classroom. As a class period changes, the subject matter discussed within the classroom typically changes. It is likely that the students within the classroom will be required to take out new materials or submit an assignment at this point in time. Therefore, a teacher (i.e., a user) may modify one or more dynamically user-customizable beacon IEs included in the beacon transmitted by the AP 511 to alert the one or more students as to the necessary actions they must take. For example, a beacon including one or more dynamically user-customizable IEs transmitted by the AP 511 may instruct the students to submit a homework assignment pertaining to the class period that is about to begin. The teacher may use the user input device 520 (e.g., a computer) to access a webpage or an application allowing the teacher to modify one or more dynamically user-customizable IEs to be included in the beacon transmitted by the AP 511. Upon receipt of the modified one or more dynamically user-customizable IEs, the AP 511 will modify its beacon accordingly and beginning transmitting the modified beacon immediately. The use of a webpage or application to modify one or more dynamically user-customizable IEs will be discussed in further detail below.

Figure 6:
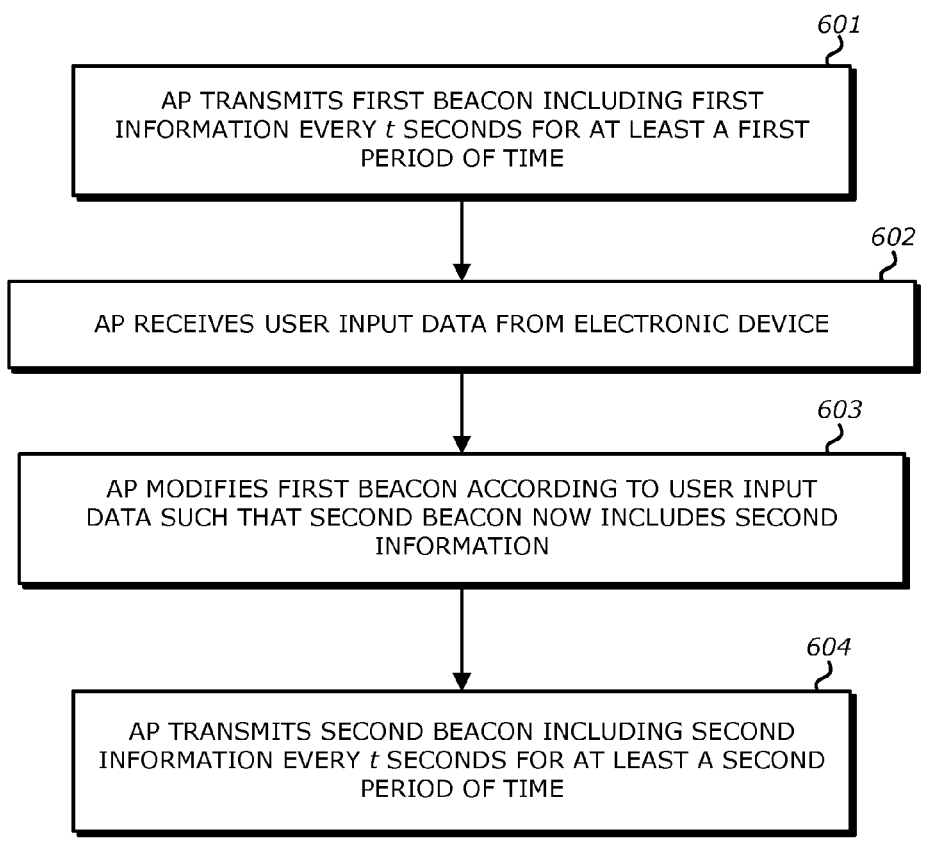
FIG. 6 is a flowchart of an exemplary method for customizing information included in a beacon through a user input device.

Referring to FIG. 6, a flowchart of an exemplary method for customizing one or more dynamically user-customizable IEs included in a beacon through a user input device is shown. In block 601, an AP transmits a first beacon including first information every t seconds for at least a first period of time. Therefore, there is a time difference of x seconds between transmissions of beacons by the AP (the time interval between transmissions is x seconds). In block 602, the AP receives user input data from an electronic device. The user input data provides instructions to modify one or more dynamically user-customizable IEs within the first information. In block 603, the AP modifies the information included in the first beacon according to the received user input data. As a result of the modification, a second beacon now includes second information that may include altered, additional or fewer IEs as compared to the first beacon. At least one of the first information or the second information includes one or more dynamically user-customizable IEs. The first information will not be equivalent to the second information. In block 604, the AP transmits the second beacon including the second information every x seconds for at least a second period of time.

The shift from transmission of a beacon including first information to transmission of a beacon including second information may not have an effect on the time interval used by the AP. Such a shift may occur seamlessly meaning that the modification of the beacon from including first information to second information occurs within x seconds.

Figure 7:
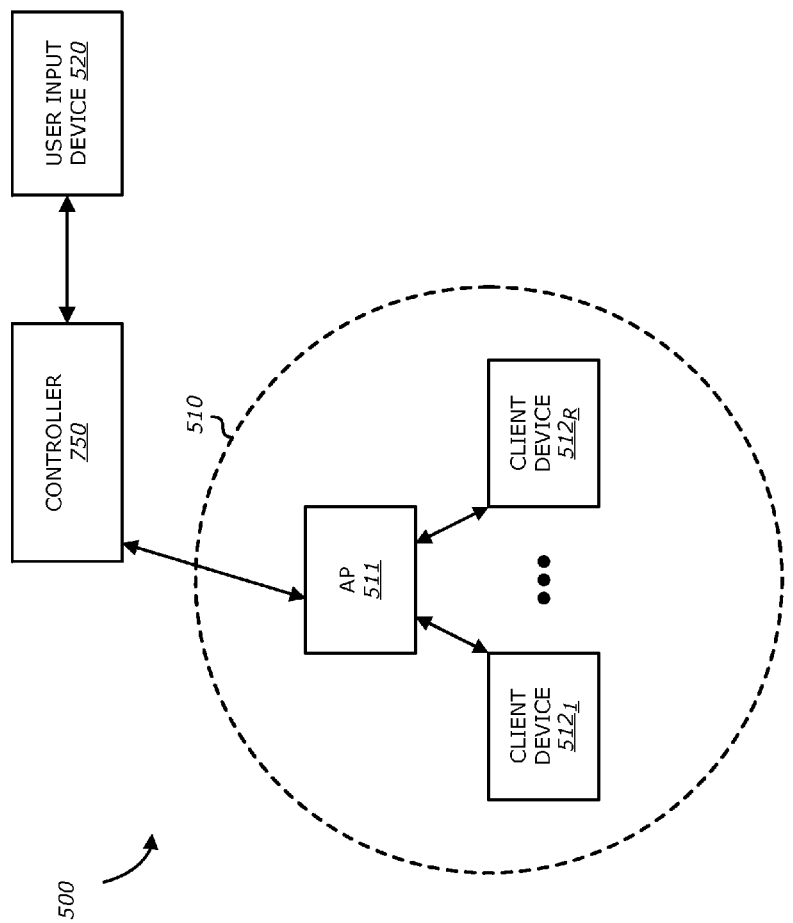
FIG. 7 is a second exemplary diagram illustrating one or more client devices receiving a beacon from an AP that receives a modification to information included within the beacon transmitted by the AP from a controller wherein the controller receives the modification from a user input device within a wireless communication network.

Referring to FIG. 7, the wireless communication network of FIG. 5 including a controller is shown. FIG. 7 illustrates that the user input device 520 may provide the modified information to be included in the beacon of the AP 511 to the controller 750. The controller 750 may then provide the modified information to be included in the beacon to AP 511. In addition, although not shown, the controller 750 may provide modified information from one or more user input devices to one or more APs.

III. USER INPUT PLATFORMS FOR CUSTOMIZABLE INFORMATION WITHIN BEACON

Figure 8:
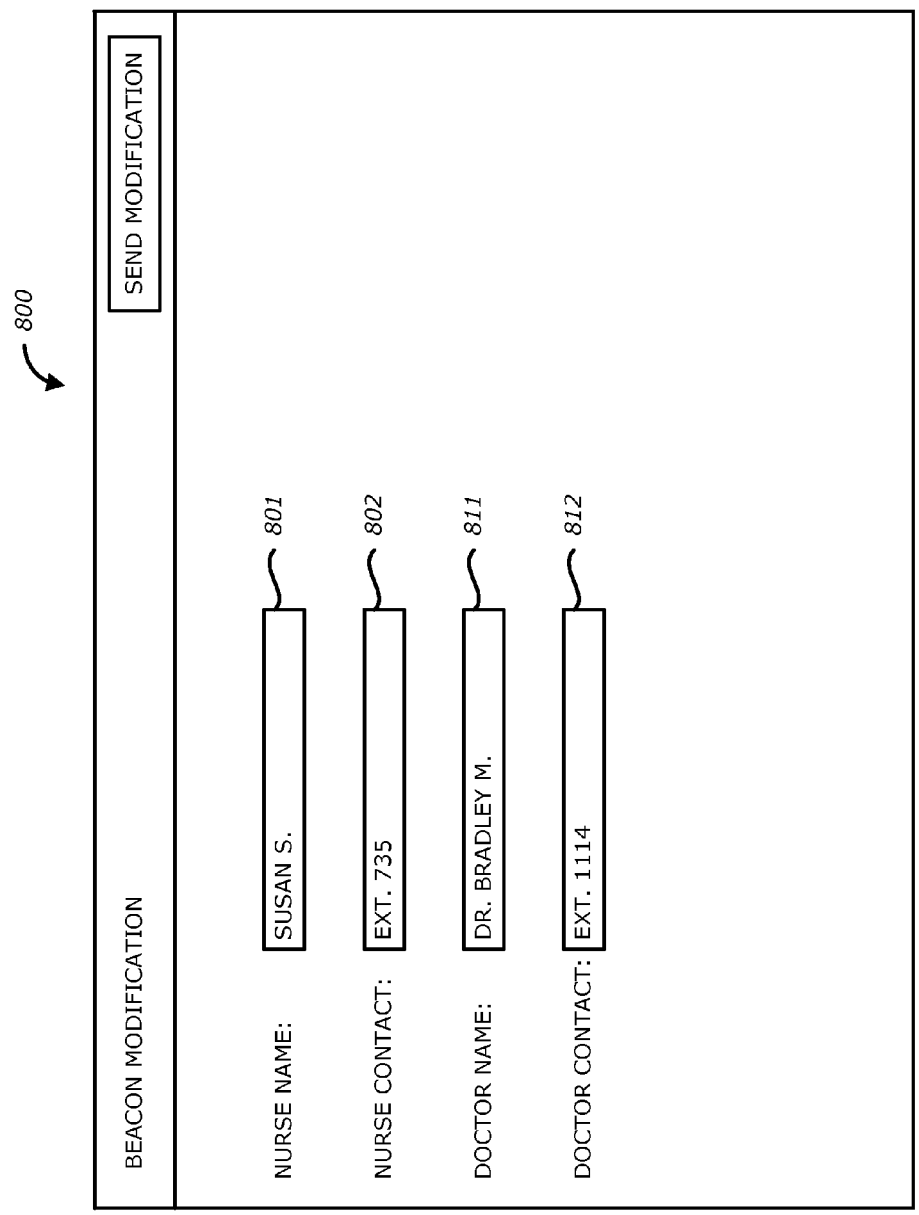
FIG. 8 is an exemplary box diagram illustrating a screen that may be utilized to modify one or more IEs to be included in a beacon.

Referring to FIG. 8, an exemplary box diagram illustrating a screen that may be utilized to modify one or more dynamically user-customizable beacon IEs is shown. The screen 800, labeled "BEACON MODIFICATION," provides an exemplary illustration of a screen that may be utilized to alter, add, and/or remove one or more dynamically user-customizable IEs to be included in a beacon of one or more APs. The contents of the screen 800 may correspond to, for example, the dynamically user-customizable IEs that may be transmitted by one or more APs. Once the content on the screen 800 is modified, the one or more corresponding APs will modify their beacons according to the modified contents of the screen 800 and begin transmitting the modified beacons immediately.

The screen 800 includes four text boxes into which a user may enter text corresponding to four separate dynamically user-customizable beacon IEs. For example, a nurse shift change within a hospital may prompt the need to modify one or more dynamically user-customizable beacon IEs to be included in a beacon of one or more APs within a wireless communications network. In such an example, the user may be one or more of, among others, a nurse, a doctor and/or a network administrator. The textbox 801 corresponds to the name of a nurse that will be present in the hospital during the present shift. The textbox 802 corresponds to the contact information of the nurse listed in the textbox 801. The contact information is listed as a telephone extension at which the nurse in listed in the textbox 801 may be reached. This contact information is not limited to the telephone extension at which a nurse may be reached but may include, among others, a number of the nurse's pager or an extension to a receptionist's desk having the capability to route the call to the appropriate nurse. The textbox 811 corresponds to the name of a doctor that will be present in the hospital during the present shift. In addition, the textbox 812 corresponds to the contact information of the doctor and is similar to the contact information of the nurse as discussed above. Of course, more or less textboxes may be present indicating more or less dynamically user-customizable IEs the user may alter, add and/or remove from a beacon of one or more APs.

In addition, the input fields in the screen 800, represented by the textboxes 801, 802, 811 and 812, may include one or more forms of alternative input methods. Examples of alternative input methods may include, but are not limited or restricted to, radio buttons, checkboxes and/or dropdown boxes.

Figure 9:
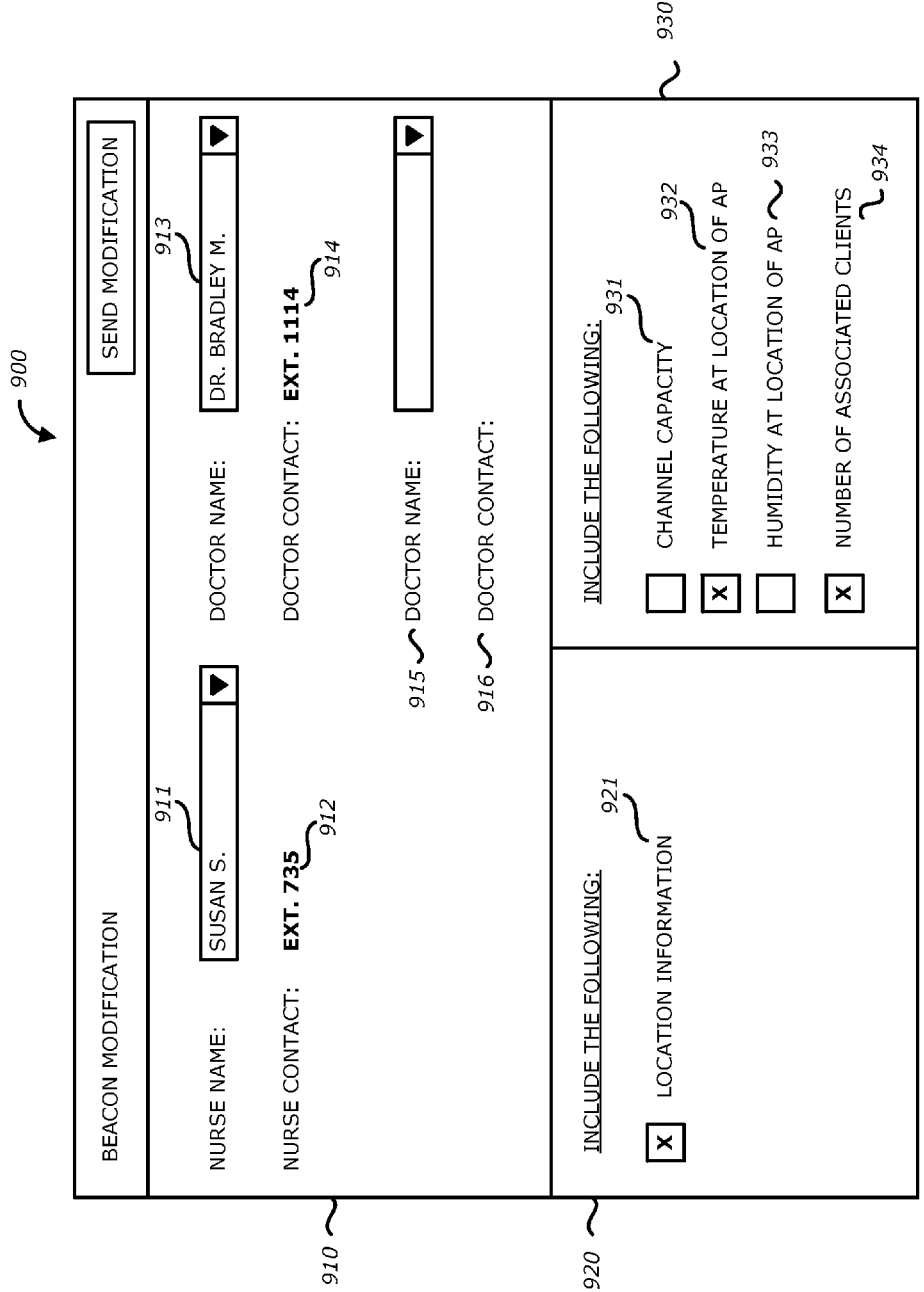
FIG. 9 is a second exemplary box diagram illustrating a screen that may be utilized to modify one or more IEs to be included in a beacon.

Referring to FIG. 9, a second exemplary box diagram illustrating a screen that may be utilized to modify one or more dynamically user-customizable IEs to be included in a beacon is shown. The screen 900, labeled "BEACON MODIFICATION," provides an alternative to the exemplary illustration of the screen 800 of FIG. 8. The screen 900 is comprised of three sections: the sections 910, 920 and 930. The section 910 corresponds to dynamically customizable user input, the section 920 corresponds to static information provided by the AP transmitting the beacon and the section 930 corresponds to dynamic information provided by the AP transmitting the beacon. The section 910 includes three dropdown boxes, the dropdown boxes 911, 913 and 915, that allow a user to select the name of a nurse (the dropdown box 911) and the name of the doctor(s) (the dropdown boxes 913 and 915) that will be present in the hospital during the current shift. Furthermore, the fields 912, 914 and 916 may be automatically populated with the contact information of the selected nurse and selected doctor(s) respectively. The contact information of the nurse (field 912) may be pulled from a database containing the contact information of every nurse employed by the hospital. The contact information of the doctor(s) (fields 914 and 916) may be populated in the same manner. In this scenario, the user needs only to know the name of the nurse and/or doctor(s) to modify at least one contact field in the section 910.

Alternatively, the contact information of the nurse and/or the doctor(s) may be extracted from a database by the client device. For example, the client device may have access to a database including the contact information of every nurse employed by the hospital and may extract the nurse's contact information based on the nurse's name. In the embodiment of FIG. 9, the fields 912, 914 and 916 are not modifiable by the user and therefore prevent any typographical errors when entering the contact information of either the selected nurse and/or the selected doctor.

In addition, the dropdown box 915 is shown in FIG. 9 with no doctor selected and the field 916 has not been populated with contact information. Therefore, a dynamically user-customizable beacon IE for neither the second doctor nor the contact information of the second doctor would appear in the beacon transmitting information included in the screen 900.

Still referring to FIG. 9, if a user selected a doctor from the dropdown box 915, the contact information of the selected doctor may be automatically populated in the field 916. Therefore, a dynamically user-customizable beacon IE would be added to the beacon corresponding to the screen 900 for each of the dropdown box 915 and the field 916. The information contained in the dropdown box 915 and the field 916 would be transmitted to the corresponding AP (or controller) along with the other information included in the screen 900. The corresponding AP would add two dynamically user-customizable IEs to its beacon representing the dropdown box 915 and the field 916. Therefore, the screen 900 provides a way for a user to dynamically customize a beacon by adding one or more dynamically user-customizable beacon IEs.

The section 920 corresponds to static information provided by the AP transmitting the beacon and includes the checkbox 921 representing the location information of the AP transmitting the beacon. The checkbox 921 allows a user to select whether the beacon will include the location information of the transmitting AP. Such information may be useful when one or more client devices receiving the beacon will allow the beacon to influence or control one or more operations of the client device only if the beacon is transmitted from an AP at a certain location. For example, a telephone (i.e., a client device) may be located in a conference room but may be within range of multiple APs. Therefore, the telephone may only allow the beacon to influence or control one or more operations of the client device transmitted by the AP also located within the conference and disregard beacons transmitted by one or more APs located outside of the conference room.

Alternatively, a telephone (i.e., a client device) may use the location information of the AP transmitting the beacon to indicate its current location. For example, when the telephone makes an outgoing call, the receiving telephone may denote the location of the telephone making the incoming call based on the location information of the AP received in the beacon. The static information provided by the AP may include any information that is provided by the AP but is not routinely modified. Typically, this may include any information programmed into the AP during its manufacture or any information downloaded by the AP through a configuration file.

In one embodiment, a user may determine that inclusion of the location information of the AP is no longer necessary and uncheck the checkbox 921. In this instance, the AP would modify its beacon upon receipt of the information included in the screen 900. By unchecking the checkbox 921, a user is dynamically customizing the beacon by removing a dynamically user-customizable beacon IE.

The section 930 corresponds to dynamic information provided by the AP transmitting the beacon and includes the checkbox 931 representing the channel capacity of the AP transmitting the beacon, the checkbox 932 representing the temperature at the location of the AP transmitting the beacon, the checkbox 933 representing the humidity at the location of the AP transmitting the beacon and the checkbox 934 representing the number of clients associated with the AP transmitting the beacon. In the embodiment of FIG. 9, the checkboxes 932 and 934 are selected and the checkboxes 931 and 933 are not selected. The dynamic information provided by the AP may include any information that is updated routinely (e.g., at regular intervals) by the AP itself.

In one embodiment, the number of clients associated with the AP transmitting the beacon may be used by clients associated to with the AP to determine whether it would be advantageous to associate with a different AP. In addition, or alternatively, the number of clients associated with the AP transmitting the beacon may be used by clients looking to associate with an AP on the network in its determination of which AP with which it should associate.

Figure 10:
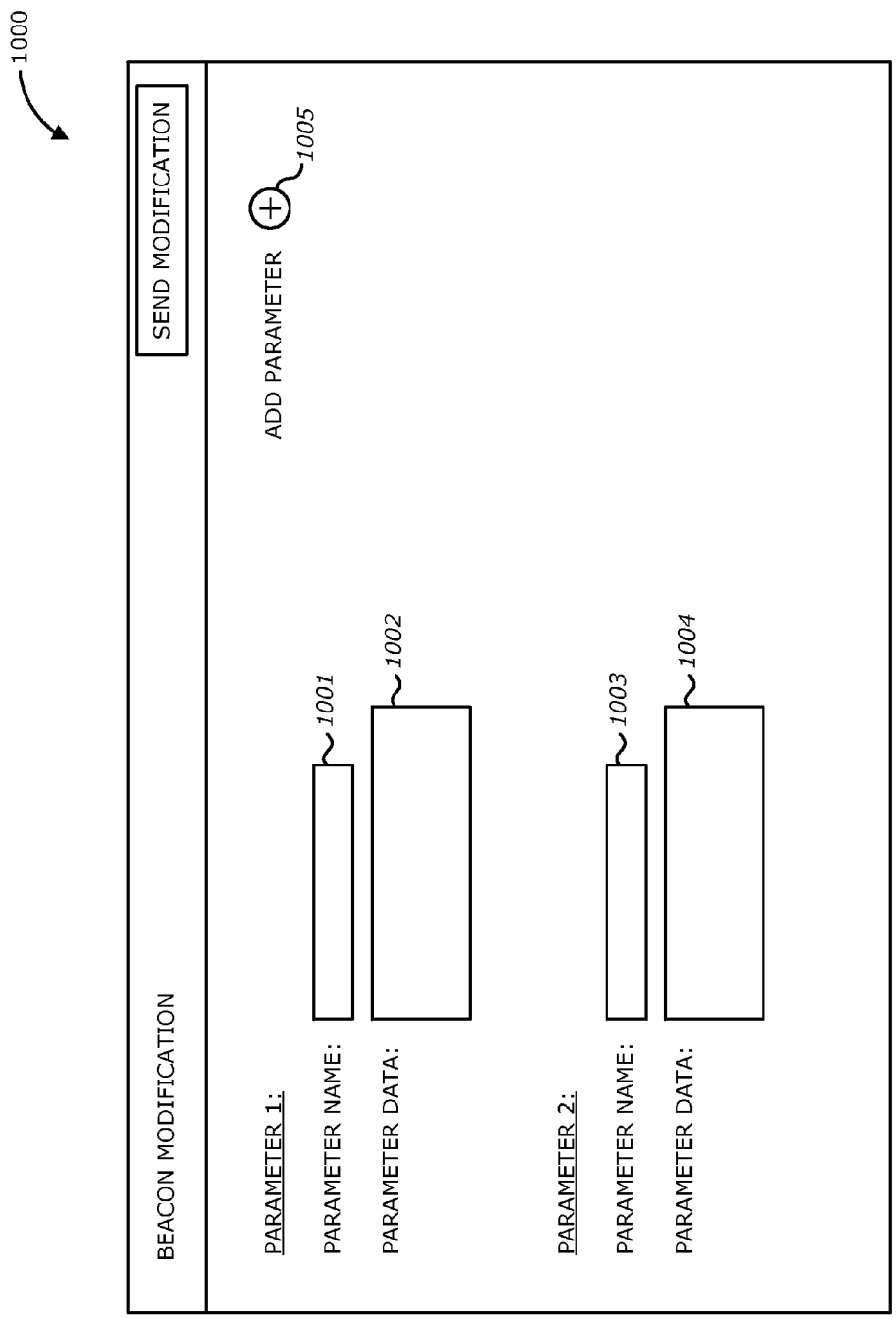
FIG. 10 is a third exemplary box diagram illustrating a screen that may be utilized to modify one or more dynamically user-customizable IEs to be included in a beacon.

Referring to FIG. 10, a third exemplary box diagram illustrating a screen that may be utilized to modify one or more dynamically user-customizable IEs to be included in a beacon is shown. The screen 1000, labeled "BEACON MODIFICATION," provides an alternative to the exemplary illustration of the screens 800 and 900 of FIGS. 8 and 9 respectively. The screen 1000 includes input areas (in this example, textboxes) for two separate parameters. Parameter 1 and Parameter 2 are illustrated as generic parameters that are completely customizable by the user. In particular, referring to Parameter 1, a user may customize the parameter name via textbox 1001 and may customize the data of Parameter 1 via textbox 1002. In addition, Parameter 2 is present and completely customizable as well. A user may customize the name of Parameter 2 via textbox 1003 and the data of Parameter 2 via textbox 1004. Parameter 2 is optional and need not be filled in by the user.

In addition, option 1005 allows a user to add an extra parameter. The user may add as many parameters as need be. The size of the beacon transmitting the various parameters will be adjusted accordingly. If the data contained in the parameters created by the user are not all able to be transferred in one beacon, the transmitter may include a flag in the first beacon that one or more subsequent beacons will follow containing the remainder of the data.

Furthermore, any of the fields illustrated FIGS. 8-10 may be implemented as any alternative form of an input format. The input formats appearing in FIGS. 8-10 are strictly for illustrative purposes and should not serve to limit the implementation of one or more screens used to allow a user to dynamically customize one or more beacon IEs. In addition, more or less input options may be provided for a user.

IV. ACCESS POINT (AP) TRANSMISSION OF DYNAMICALLY USER-CUSTOMIZABLE INFORMATION ELEMENTS WITHIN A PROBE RESPONSE

As discussed above, a user may provide input that dynamically customizes one or more IEs within a beacon transmitted by one or more APs. As an alternative embodiment, a user may provide input that dynamically customizes one or more probe responses transmitted by an AP. An AP may generate and transmit a first set of probe responses in response to receipt of one or more probes from one or more client devices. Each probe response in the first set of probe responses includes one or more dynamically user-customizable IEs. A user, either directly or via a user input device, may provide user input that includes instructions to modify one or more of the dynamically user-customizable IEs included in each probe response of the first set of probe responses. Based on the user input, the AP may modify one or more dynamically user-customizable IEs thereby generating a second set of probe responses. The AP may then begin transmission, either immediately or at a time specified by the user input, of the second set of probe responses in response to a probe from a client device.

As discussed above regarding dynamically user-customizable IEs transmitted within a beacon, the dynamically user-customizable IEs transmitted within a probe response may by modified in real time without affecting the transmission of one or more probe response. Furthermore, FIGS. 1-10 and the relevant discussions of each apply equally to a dynamically user-customizable IEs transmitted within a probe response as they do to a dynamically user-customizable IEs transmitted within a beacon.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
an access point comprising a hardware processor and a memory on which is stored machine readable instructions that are executable to cause the hardware processor to:
periodically transmit, by the access point, a first beacon frame comprising a plurality of Information Elements (IEs);
based on user input, configure at least one IE of the plurality of IEs in the first beacon frame;
modify the at least one IE of the plurality of IEs in the first beacon frame based at least on the user input to obtain a second beacon frame comprising a modified IE based on the user input, wherein the at least one modified IE is associated with an identifier and includes information that does not pertain to the access point; and wherein the modified IE includes at least one of a user name and a user contact information listed in the second beacon, and periodically transmit, by the access point, the second beacon frame comprising the modified IE.

2. The system of claim 1, wherein the instructions are executable to cause the hardware processor to periodically transmit the first beacon frame every x seconds for at least a first period of time, wherein a time difference between transmitting the first beacon frame and the second beacon frame is x seconds, and wherein the instructions are further executable to cause the hardware processor to periodically transmit the second beacon frame every x seconds for at least a second period of time.

3. The system of claim 1, wherein a shift from transmitting the first beacon frame to transmitting the second beacon frame is completed without affecting a time interval used by the access point for transmission of beacon frames.

4. The system of claim 1, wherein the user input specifies a subset of Virtual Access Points executing on the access point that is to transmit the modified IE.

5. The system of claim 1, wherein to modify the at least one IE in the first beacon frame to obtain the second beacon frame, the instructions are further executable to cause the hardware processor to dynamically modify the at least one IE in the first beacon frame in real time while the access point is continuing to provide network access to one or more client devices.

6. The system of claim 1, wherein the user input is received at a second device different than the access point.

7. The system of claim 1, wherein the user input is received while the access point is periodically transmitting the first beacon frame, and wherein to modify the at least one IE, the instructions are further executable to cause the hardware processor to modify the at least one IE immediately upon receiving the user input.

8. The system of claim 1, wherein the user input is received while the access point is periodically transmitting the first beacon frame, and wherein the instructions are further executable to cause the hardware processor to modify the at least one IE at a time specified by the user input.

9. The system of claim 1, wherein the modified at least one IE is associated with a location.

10. The system of claim 9, wherein a receiving device uses or ignores the modified at least one IE based on whether or not the receiving device is located at the location.

11. The system of claim 1, wherein a receiving device uses or ignores the modified at least one IE based on whether or not the receiving device is associated with the identifier.

12. The system of claim 1, wherein the system comprises a particular network device, and wherein the particular network device modifies an operation and/or functionality based on the modified at least one IE received from the access point.

13. The system of claim 12, wherein the particular network device and said access point are both access points made by different vendors.

14. The system of claim 1, wherein the user input is received using a Command Line Interface (CLI) or web interface.

15. The system of claim 1, wherein the user input is received by the access point from a client device.

16. The system of claim 1, wherein a receiving device is to cause the modified at least one IE to be displayed in response to receipt of the second beacon frame.

17. An access point comprising:
a hardware processor and a memory on which is stored machine readable instructions that are to cause the hardware processor to:
generate, by the access point, a first set of probe responses, wherein each of the probe responses in the first set of probe responses comprises a particular Information Element (IE) with a same first value;
based on user input, modify the first value in the particular IE in a first beacon frame to obtain a second beacon frame comprising a modified IE, wherein the particular IE and the modified IE are unrelated to information pertaining to the access point; and wherein
the modified IE is associated with an identifier and includes at least one of a user name and contact information of a user listed in a beacon frame associated with the modified IE; and
generate, by the access point, a second set of probe responses, wherein each of the probe responses in the second set of probe responses comprises the modified IE.

18. The access point of claim 17, wherein the particular IE comprises at least one of a user name and a user contact information.

* * * * *